US012700362B2

(12) United States Patent
Park

(10) Patent No.: US 12,700,362 B2
(45) Date of Patent: Aug. 4, 2026

(54) DISPLAY DEVICE AND METHOD OF DRIVING THE SAME

(71) Applicant: LG Display Co., Ltd., Seoul (KR)

(72) Inventor: Jong Sin Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/983,977

(22) Filed: Dec. 17, 2024

(65) Prior Publication Data

US 2025/0246143 A1 Jul. 31, 2025

(30) Foreign Application Priority Data

Jan. 31, 2024 (KR) ........................ 10-2024-0015256

(51) Int. Cl.
*G09G 3/3233* (2016.01)

(52) U.S. Cl.
CPC ... *G09G 3/3233* (2013.01); *G09G 2300/0842* (2013.01); *G09G 2330/12* (2013.01)

(58) Field of Classification Search
CPC ......... G09G 3/3233; G09G 2300/0842; G09G 2330/12; G09G 3/3225; G09G 3/006; G09G 2320/043; H10K 59/131
See application file for complete search history.

(56) References Cited

U.S. PATENT DOCUMENTS 10,482,825 B2 * 11/2019 Kim .................... G09G 3/3291
11,217,133 B2 * 1/2022 Bae ........................ G09G 3/006
11,355,066 B2 * 6/2022 Lee ...................... G09G 3/3275
11,462,158 B2 * 10/2022 Yin ...................... G09G 3/3275
2002/0050962 A1 * 5/2002 Kasai ..................... G09G 3/325 345/76
2004/0125256 A1 7/2004 Park et al.
2005/0140599 A1 * 6/2005 Lee ...................... G09G 3/3233 345/76
2011/0279746 A1 11/2011 Kim et al.
2013/0134986 A1 * 5/2013 Yun ........................ G09G 3/006 324/543
2014/0111498 A1 4/2014 Kim et al.
2015/0029171 A1 * 1/2015 Jo ........................ G09G 3/3233 345/82

(Continued)

FOREIGN PATENT DOCUMENTS

KR 10-0488156 B1 5/2005
KR 10-1113340 B1 2/2012

(Continued)

OTHER PUBLICATIONS

Dictionary.com, "adjacent," in Dictionary.com Unabridged. Source location: Random House, Inc. http://dictionary.reference.com/browse/adjacent, Nov. 18, 2011, p. 1.*

*Primary Examiner* — Jeff Piziali
(74) *Attorney, Agent, or Firm* — Morgan, Lewis & Bockius LLP

(57) ABSTRACT

A display device includes a display panel including a plurality of subpixels connected to a high-potential voltage line and a plurality of low-potential voltage lines, respectively, a driver configured to drive the display panel, and a circuit configured to sense and compensate for a characteristic of a subpixel, among the plurality of pixels, through at least one of the plurality of low-potential voltage lines.

13 Claims, 19 Drawing Sheets

(56) References Cited

U.S. PATENT DOCUMENTS

| | | | | |
|---|---|---|---|---|
| 2017/0004773 | A1* | 1/2017 | Kim | G09G 3/006 |
| 2017/0162119 | A1* | 6/2017 | Kim | G09G 3/3258 |
| 2019/0005886 | A1* | 1/2019 | Lee | G09G 3/3258 |
| 2019/0019452 | A1* | 1/2019 | Zhu | G09G 3/3266 |
| 2019/0212850 | A1 | 7/2019 | Kim | |
| 2021/0335234 | A1* | 10/2021 | Yin | G09G 3/3291 |

FOREIGN PATENT DOCUMENTS

| | | | |
|---|---|---|---|
| KR | 10-1940220 | B1 | 1/2019 |
| KR | 10-2477989 | B1 | 12/2022 |

* cited by examiner

DISPLAY DEVICE AND METHOD OF DRIVING THE SAME

This application claims the benefit of and priority to Korean Patent Application No. 10-2024-0015256, filed on Jan. 31, 2024, which is hereby incorporated by reference as if fully set forth herein.

BACKGROUND

Field

The present disclosure relates to a display device and a driving method of the same.

Discussion of the Related Art

With the development of information technology, the market for display devices that are media for connection between users and information has been growing. Accordingly, display devices such as a light-emitting display (LED) device, a quantum dot display (QDD), and a liquid crystal display (LCD) have been increasingly used.

Each of the above display devices includes a display panel including subpixels, a driver configured to output a driving signal for driving of the display panel, and a power supply configured to generate power to be supplied to the display panel or the driver.

In such a display device, when driving signals, for example, scan signals and data signals, are supplied to subpixels formed in a display panel, a selected one of the subpixels may transmit light therethrough or may directly emit light, thereby displaying an image.

SUMMARY

Accordingly, the present disclosure is directed to a display device and a method of driving the same that substantially obviate one or more problems due to limitations and disadvantages of the related art.

The present disclosure improves display quality and lifespan by sensing element(s) included in a subpixel through a low-potential voltage line, determining the presence or absence of a change in characteristics (threshold voltage, current mobility, etc.) of an element, and compensating for a subpixel depending on the degree of change in characteristics. In addition, the present disclosure improves sensing accuracy and sensing reliability of element(s) included in a subpixel.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a display device includes a display panel including a plurality of subpixels connected to a high-potential voltage line and a plurality of low-potential voltage lines, respectively, a driver configured to drive the display panel, and a circuit configured to sense and compensate for a characteristic of a subpixel, among the plurality of subpixels, through at least one the plurality of low-potential voltage lines.

The plurality of low-potential voltage lines may be parallel to a data line located on the display panel and may be disposed spaced apart.

The display panel may further include a plurality of switches each electrically connecting two low-potential voltage lines adjacent to each other in the plurality of low-potential voltage lines.

The plurality of switches may be turned on during a display period in which an image is displayed based on the plurality of subpixels, and at least one of the plurality of switches may be turned off during a sensing period in which the characteristic of the subpixel is sensed.

The circuit may sense the characteristic of the subpixel by using the at least one of the plurality of low-potential voltage lines as a sensing line during the sensing period.

The plurality of switches may be selectively disposed in one of an active area and a non-active area of the display panel.

A reference voltage higher than a low-potential voltage applied during the display period may be applied to the at least one low-potential voltage line used as the sensing line during the sensing period.

The display panel may further include a plurality of shorting bars each electrically connecting two low-potential voltage lines adjacent to each other in the plurality of low-potential voltage lines, a switch arrangement area in which the plurality of switches is disposed, and a shorting bar arrangement area in the plurality of shorting bars are disposed.

In another aspect of the present disclosure, a method of driving a display device, including a display panel including a plurality of subpixels connected to a high-potential voltage line and a plurality of low-potential voltage lines respectively, a driver configured to drive the display panel, a circuit configured to sense and compensate for a characteristic of a subpixel, among the plurality of subpixels, through at least one of the plurality of low-potential voltage lines, and a plurality of switches each electrically connecting two low-potential voltage lines adjacent to each other in the plurality of low-potential voltage lines, includes a display operation of turning on the plurality of switches to display an image based on the plurality of subpixels, a sensing operation of turning off at least one of the plurality of switches to sense the characteristic of the subpixel among the plurality of subpixels, and a compensation operation of preparing a compensation value to compensate for the subpixel based on a sensing value acquired from the subpixel.

The display panel may further include a plurality of shorting bars each electrically connecting two low-potential voltage lines adjacent to each other in the plurality of low-potential voltage lines, a switch arrangement area in which the plurality of switches is disposed, and a shorting bar arrangement area in the plurality of shorting bars are disposed.

At least one of the plurality of low-potential voltage lines may be used as a sensing line during the sensing operation.

A reference voltage higher than a low-potential voltage applied during the display operation may be applied to the at least one low-potential voltage line used as the sensing line during the sensing operation.

It is to be understood that both the foregoing general description and the following detailed description of the present disclosure are by way of example and are intended to provide further explanation of the disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

A display device according to the present disclosure may be implemented as a television, a video player, a personal computer (PC), a home theater, an automotive electric device, or a smartphone, but is not limited thereto. The display device according to the present disclosure may be implemented as an LED device, a QDD, or an LCD. For convenience of description, an LED device that directly emits light based on an inorganic light-emitting diode or an organic light-emitting diode will hereinafter be taken as an example.

In addition, a thin film transistor (TFT) described below may be implemented as an n-type TFT, as a p-type TFT, or in a form in which n-type and p-type are present together. The TFT is a three-electrode element including a gate, a source, and a drain. The source is an electrode that supplies a carrier to a transistor. In the TFT, a carrier starts flowing from the source. The drain is an electrode through which a carrier exits the TFT. That is, in the TFT, a carrier flows from the source to the drain.

In the case of the p-type TFT, since the carrier is a hole, a source voltage is higher than a drain voltage so that the hole may flow from the source to the drain. In the p-type TFT, a hole flows from the source to the drain side, and thus current flows from the source to the drain side. In contrast, in the case of the n-type TFT, since an electron is a carrier, the source voltage is lower than the drain voltage so that an electron may flow from the source to the drain. In the n-type TFT, an electron flows from the source to the drain side, and thus current flows from the drain to the source side. However, the source and the drain of the TFT may be changed depending on the applied voltage. Reflecting this, in the following description, one of the source and drain will be described as a first electrode, and the other of the source and drain will be described as a second electrode.

Figure 1:
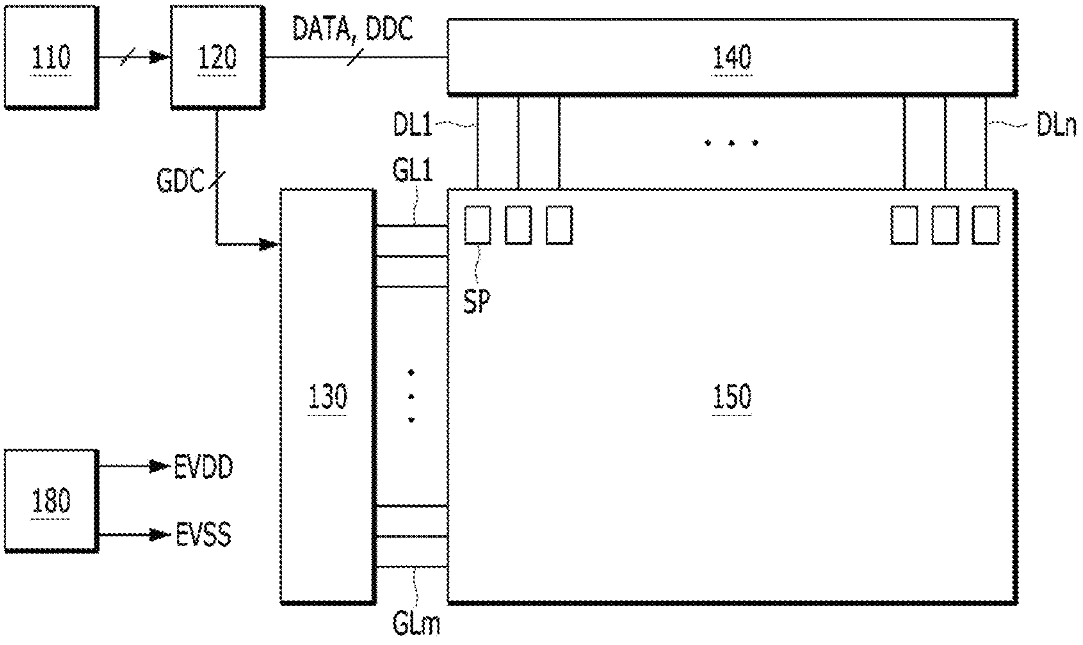
FIG. 1 is a block diagram schematically illustrating an LED device according to example embodiments of the present disclosure.
Figure 2:
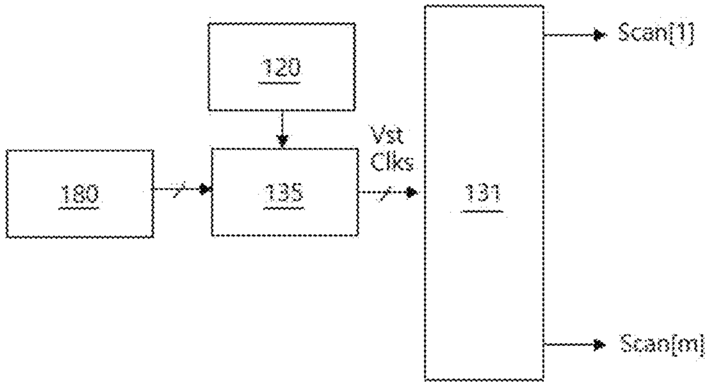
FIGS. 2 and 3 are diagrams for describing example configurations of a gate-in-panel (GIP)-type scan driver.
Figure 3:
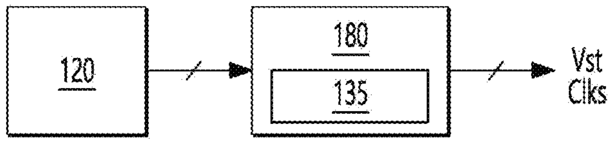
Figure 4:
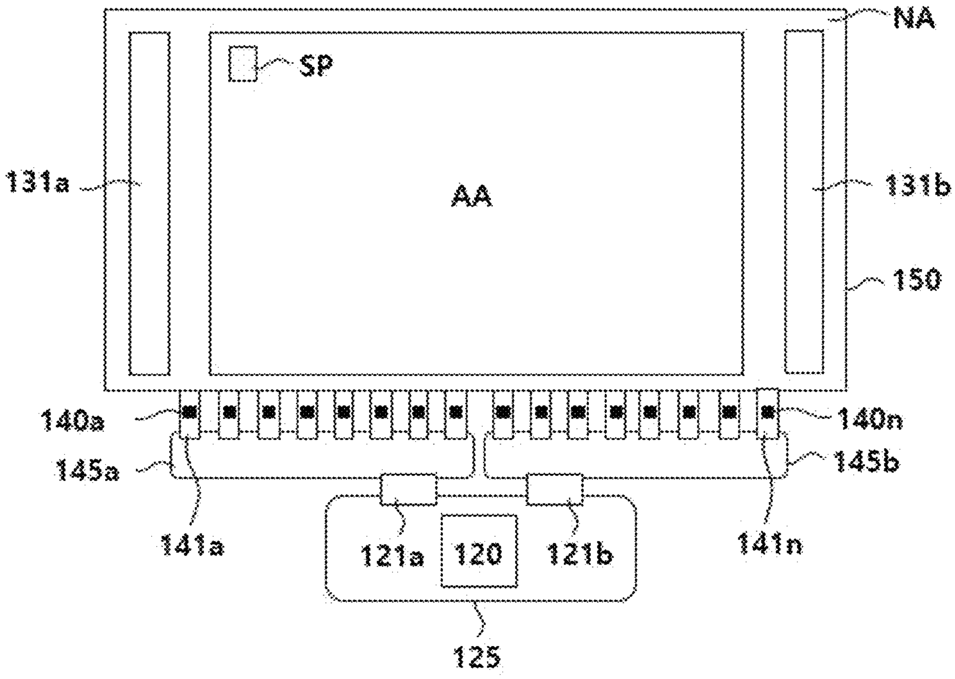
FIG. 4 is a module configuration diagram of the LED device according to example embodiments of the present disclosure.
Figure 5:
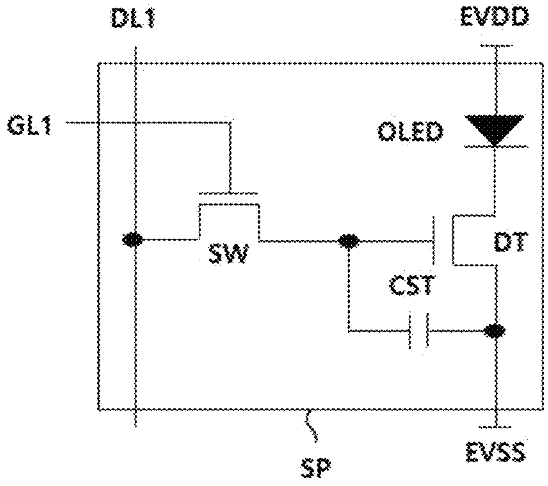
FIG. 5 is an example circuit configuration diagram of a subpixel included in a display panel of FIG. 4.

FIG. 1 is a block diagram schematically illustrating an example LED device, FIGS. 2 and 3 are diagrams for describing example configurations of a GIP-type scan driver, FIG. 4 is a module configuration diagram of the example LED device, and FIG. 5 is an example circuit configuration diagram of a subpixel included in a display panel of FIG. 4.

As illustrated in FIG. 1, the LED device may include an image supply 110, a timing controller 120, a scan driver 130, a data driver 140, a display panel 150, a power supply 180, etc.

The image supply (set or host system) 110 may output various driving signals together with an externally-supplied image data signal or an image data signal stored in an internal memory. The image supply 110 may supply the data signal and the various driving signals to the timing controller 120.

The timing controller 120 may output a gate timing control signal GDC for control of operation timing of the scan driver 130, a data timing control signal DDC for control of operation timing of the data driver 140, various synchronization signals (a vertical synchronization signal Vsync and a horizontal synchronization signal Hsync), etc. The timing controller 120 may supply a data signal DATA supplied from the image supply 110 together with the data timing control signal DDC to the data driver 140. The timing controller 120 may take the form of an integrated circuit (IC) and be mounted on a printed circuit board, but is not limited thereto.

The scan driver 130 may output a scan signal (or scan voltage) in response to the gate timing control signal GDC supplied from the timing controller 120. The scan driver 130 may supply the scan signal to each of subpixels included in the display panel 150 through gate lines GL1 to GLm. The scan driver 130 may take the form of an IC or may be formed directly on the display panel 150 in a GIP manner, but is not limited thereto.

The data driver 140 may sample and latch the data signal DATA in response to the data timing control signal DDC supplied from the timing controller 120, convert the resulting digital data signal into an analog data voltage based on a gamma reference voltage, and output the converted analog data voltage. The data driver 140 may supply data voltages to the subpixels included in the display panel 150 through data lines DL1 to DLn. The data driver 140 may take the form of an IC and be mounted on the display panel 150 or on the printed circuit board, but is not limited thereto.

The power supply 180 may generate a high-potential voltage and a low-potential voltage based on an external input voltage supplied from the outside and output the high-potential voltage and the low-potential voltage through a high-potential voltage line EVDD and a low-potential voltage line EVSS. The power supply 180 may generate and output not only the high-potential voltage and the low-potential voltage, but also a voltage (for example, a gate high potential and a gate low voltage) required to drive the scan driver 130 or a voltage (for example, a drain voltage and a half drain voltage) required to drive the data driver 140.

The display panel 150 may be manufactured based on a rigid or flexible substrate of glass, silicon, polyimide, etc. The display panel 150 may include a plurality of subpixels SP for displaying an image based on a scan signal, a driving signal including a data voltage, a high-potential voltage, a low-potential voltage, etc. The subpixels SP may be connected to the first data line DL1, the first gate line GL1, the high-potential voltage line EVDD, and the low-potential voltage line EVSS. At least one of a plurality of high-potential voltage lines EVDD or a plurality of low-potential voltage lines EVSS may be disposed parallel to the first data line DL1. The subpixels SP may directly emit light. The subpixel SP may emit light of one of colors of red, green, blue, white, etc.

Meanwhile, the timing controller 120, the scan driver 130, the data driver 140, etc., have been described above as having individual configurations. However, one or more of the timing controller 120, the scan driver 130, and the data driver 140 may be integrated into one IC depending on the implementation scheme of the LED device.

As illustrated in FIGS. 2 and 3, the GIP-type scan driver may include a shift register 131 and a level shifter 135. The level shifter 135 may generate scan clock signals Clks, a start signal Vst, etc. based on signals and voltages output from the timing controller 120 and the power supply 180.

The shift register 131 may operate based on signals Clks and Vst, etc. output from the level shifter 135, and output scan signals Scan[1] to Scan[m] capable of turning on or turning off a transistor formed in the display panel. The shift register 131 may take the form of a thin film on the display panel using a GIP method.

Unlike the shift register 131, the level shifter 135 may independently take the form of an IC or be included in the power supply 180. However, this is only an example and the present disclosure is not limited thereto.

As illustrated in FIG. 4, the display panel 150 may include an active area AA in which an image is displayed and a non-active area NA in which no image is displayed. The subpixels SP may be located in the active area AA. Shift registers 131*a* and 131*b* configured to output scan signals in the GIP-type scan driver may be located in the non-active area NA.

The display panel 150 may be configured as a module (hereinafter referred to as display module) by a plurality of data drivers 140*a* to 140*n* mounted on a plurality of flexible circuit boards 141*a* to 141*n* and one timing controller 120 mounted on one control board 125. The plurality of data drivers 140*a* to 140*n* and the one timing controller 120 may be electrically connected by at least two printed circuit boards 145*a* to 145*b*, at least two cables 121*a* to 121*b*, etc. However, the configuration diagram of the display module illustrated in FIG. 4 is only to aid understanding, and the present disclosure is not limited thereto.

As illustrated in FIG. 5, one subpixel SP may include a switching transistor SW, a capacitor CST, a driving transistor DT, and an organic light-emitting diode OLED.

The switching transistor SW may serve to transmit a data voltage applied through the first data line DL1 to a first electrode of the capacitor CST. The switching transistor SW may have a gate electrode connected to the first gate line GL1, a first electrode connected to the first data line DL1, and a second electrode connected to a gate electrode of the driving transistor DT.

The capacitor CST may serve to store a data voltage for driving the driving transistor DT. The capacitor CST may have the first electrode connected to the gate electrode of the driving transistor DT and a second electrode connected to a second electrode of the driving transistor DT and the low-potential voltage line EVSS.

The driving transistor DT may serve to generate a driving current in response to the data voltage stored in the capacitor CST. The driving transistor DT may have the gate electrode connected to the first electrode of the capacitor CST, a first electrode connected to a cathode of the organic light-emitting diode OLED, and the second electrode connected to the low-potential voltage line EVSS.

The organic light-emitting diode OLED may serve to emit light in response to an operation (driving current) of the driving transistor DT. The organic light-emitting diode OLED may have an anode connected to the high-potential voltage line EVDD and the cathode connected to the first electrode of the driving transistor DT.

Figure 6:
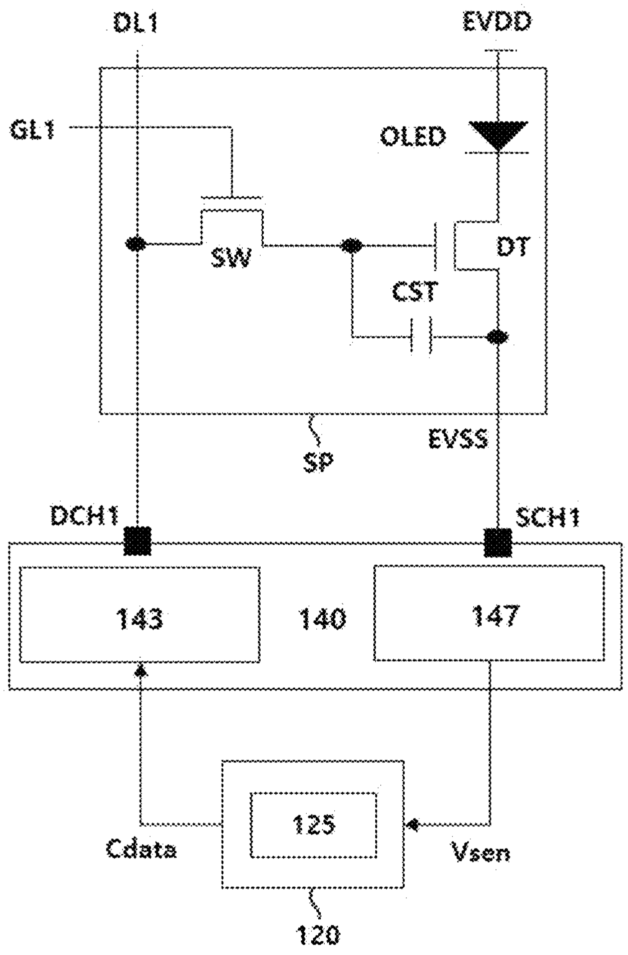
FIG. 6 is a diagram schematically illustrating a configuration of a circuit for sensing a subpixel through a low-potential voltage line according to an example embodiment.
Figure 7:
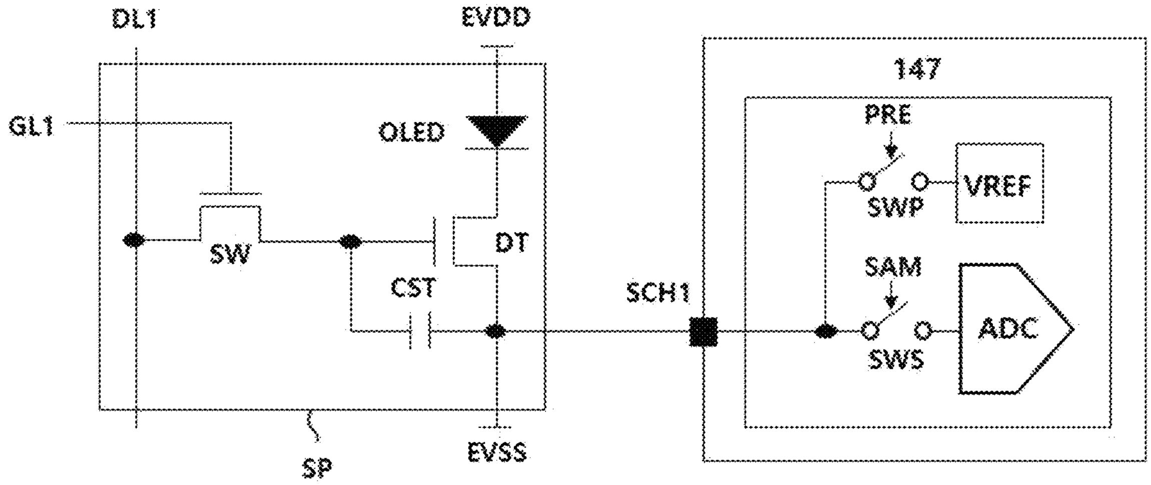
FIG. 7 is an example diagram of a pixel sensing circuit illustrated in FIG. 6.
Figure 8:
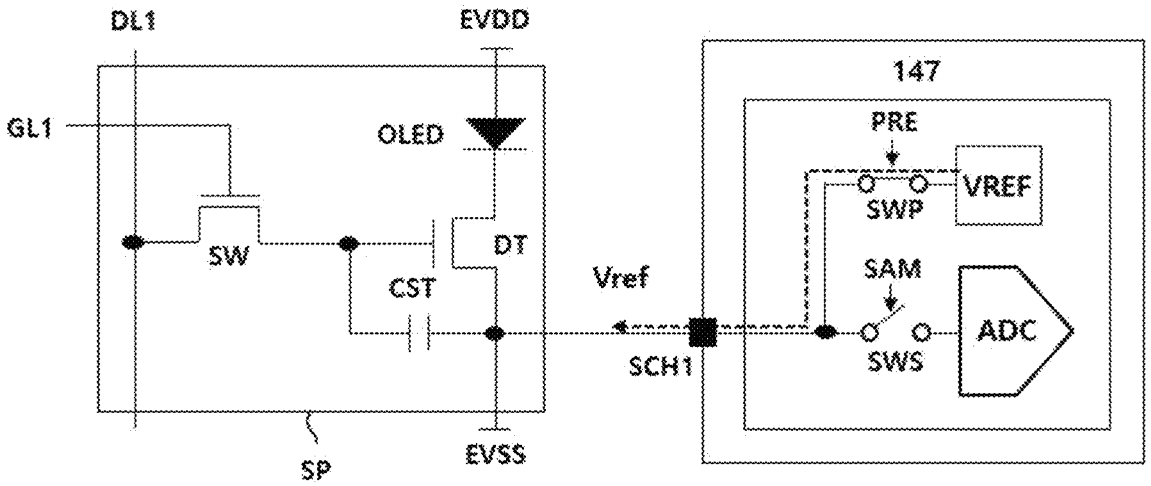
FIGS. 8 and 9 are example diagrams for describing a sensing operation of the pixel sensing circuit.
Figure 9:
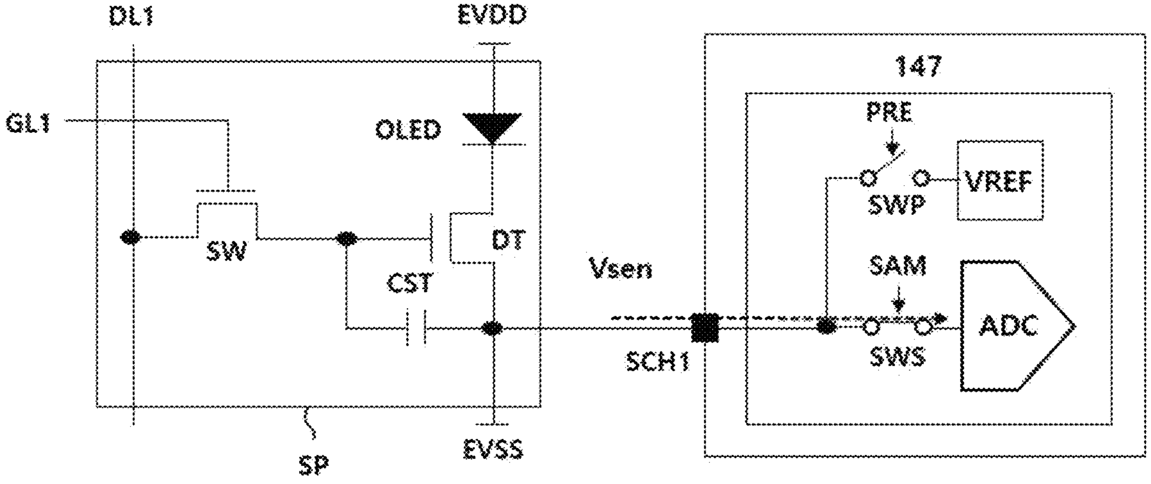

FIG. 6 is a diagram schematically illustrating a configuration of a circuit for sensing a subpixel through a low-potential voltage line according to an example embodiment, FIG. 7 is an example diagram of a pixel sensing circuit illustrated in FIG. 6, and FIGS. 8 and 9 are example diagrams for describing a sensing operation of the pixel sensing circuit.

As illustrated in FIG. 6, the data driver 140 may include a voltage output circuit 143 configured to output a data voltage and a pixel sensing circuit 147 configured to acquire a sensing value. A first output channel DCH1 of the voltage output circuit 143 may be connected to the first data line DL1 of the subpixel SP, and a first sensing channel SCH1 of the pixel sensing circuit 147 may be connected to the low-potential voltage line EVSS of the subpixel SP.

The pixel sensing circuit 147 may be used to sense the presence or absence of deterioration of the driving transistor DT and the organic light-emitting diode OLED. The pixel sensing circuit 147 may be used to sense the presence or absence of abnormalities in the driving transistor DT and the organic light-emitting diode OLED. The pixel sensing circuit 147 may be used to sense current or voltage flowing through the driving transistor DT and the organic light-emitting diode OLED.

The data driver 140 may convert a sensing value Vsen acquired by the pixel sensing circuit 147 into a digital value and transmit the converted value to the timing controller 120 (or compensation circuit). The timing controller 120 may determine whether there is a change in the characteristics (threshold voltage, current mobility, etc.) of element(s) included in the subpixel SP based on the sensing value Vsen converted to a digital value, and prepare a compensation value for compensating for the subpixel SP according to a degree of the change in the characteristics.

The timing controller 120 may include a compensator 125 configured to prepare a compensation data signal Cdata based on a compensation value to compensate for the change in the characteristics of the element(s) included in the subpixel SP based on the sensing value Vsen.

The compensator 125 may prepare a compensation value for compensating for a change in characteristics of element (s) included in a non-sensed subpixel in addition to a compensation value for compensating for a change in characteristics of an actually deteriorating element(s) based on the sensing value Vsen. In this instance, the compensator 125 may use an interpolation method or a degradation prediction method to compensate for other non-sensed subpixels in the surrounding area based on the sensing value Vsen.

In addition, the timing controller 120 may acquire driving environment variables such as changes in current, changes in voltage, and changes in temperature (a method of predicting temperature changes based on changes in current or voltage) based on the sensing value Vsen, and individually or collectively compensate for (control) the display panel and a device driving the display panel (for example, the data driver, the scan driver, the power supply, etc.) based thereon.

Meanwhile, in the above description, as an example, the sensing circuit that acquires a sensing value by sensing the characteristics of the element(s) included in the subpixel SP and the compensation circuit that prepares a compensation value based on the sensing value are separately included in the data driver 140 and the timing controller 120, respectively. However, this is merely an example and the sensing circuit that acquires a sensing value by sensing the characteristics of the element(s) included in the subpixel SP and the compensation circuit that prepares a compensation value based on the sensing value may be defined as one compensation circuit and may be integrated into one circuit. However, hereinafter, for convenience of description, an example in which the sensing circuit and the compensation circuit are separated from each other as in FIG. 6 will be described.

As illustrated in FIG. 7, the pixel sensing circuit 147 may be implemented as a voltage sensing circuit including a voltage output switch SWP, a voltage source VREF, a sampling switch SWS, an analog-to-digital converter ADC, etc.

The voltage output switch SWP may have a first electrode connected to the first sensing channel SCH1, a second electrode connected to the voltage source VREF, and a control electrode connected to a voltage output switch control line PRE. The voltage output switch SWP may be turned on when outputting a voltage generated from the voltage source VREF through the first sensing channel SCH1. The voltage source VREF may be configured to output a one-level voltage or different voltages from a first-level voltage to an Nth-level voltage depending on the purpose of use, driving method, and driving time.

The sampling switch SWS may have a first electrode connected to the first sensing channel SCH1, a second electrode connected to an input terminal of the analog-to-digital converter ADC, and a control electrode connected to a sampling switch control line SAM. The sampling switch SWS may be turned on when sensing an element included in the subpixel SP through the first sensing channel SCH1. The analog-to-digital converter ADC may further include a sample and hold circuit capable of sampling and holding voltage.

As illustrated in FIG. 8, the pixel sensing circuit 147 may initialize (or charge) the low-potential voltage line EVSS of the subpixel SP with a preset reference voltage Vref before performing a sensing operation. To this end, the voltage output switch SWP may be turned on in response to a turn-on voltage applied through the voltage output switch control line PRE. Meanwhile, the pixel sensing circuit 147 may vary the reference voltage Vref so that a different level is formed for each subpixel. In this instance, the sampling switch SWS may be turned off.

As illustrated in FIG. 9, the pixel sensing circuit 147 may sense the low-potential voltage line EVSS of the subpixel SP and acquire the sensing value Vsen to perform a sensing operation. To this end, the sampling switch SWS may be turned on in response to a turn-on voltage applied through the sampling switch control line SAM. In this instance, the voltage output switch SWP may be turned off.

Hereinafter, a display module implemented based on the configuration described above will be described.

Figure 10:
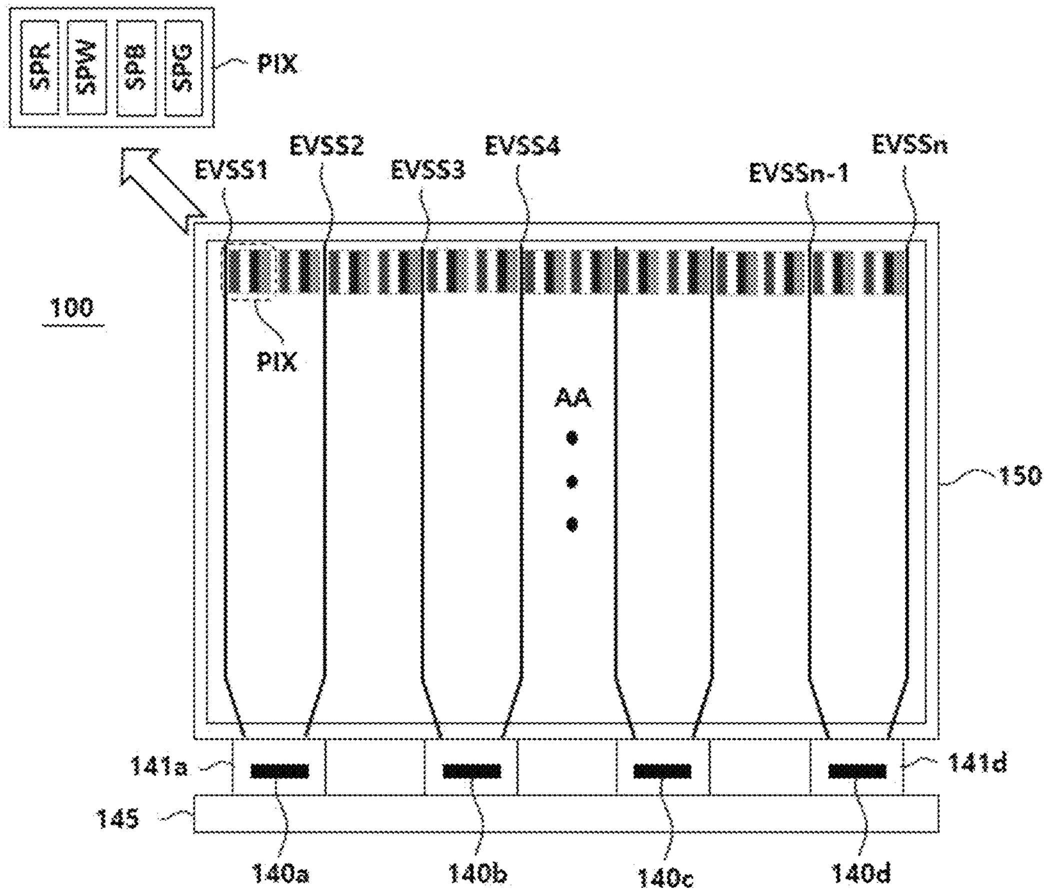
FIG. 10 is a diagram illustrating a display module according to an experimental example.

FIG. 10 is a diagram illustrating a display module according to an experimental example.

As illustrated in FIG. 10, the display module 100 according to the experimental example may include the display panel 150, the first to fourth flexible circuit boards 141*a* to 141*d* on which the first to fourth data drivers 140*a* to 140*d* are mounted, respectively, a printed circuit board 145, etc.

The display panel 150 may include a plurality of pixels PIX and a plurality of low-potential voltage lines EVSS1 to EVSSn. The plurality of pixels PIX may be disposed in an active area AA. Each of the plurality of pixels PIX may include a red subpixel SPR, a white subpixel SPW, a blue subpixel SPB, and a green subpixel SPG. The red subpixel SPR, the white subpixel SPW, the blue subpixel SPB, and the green subpixel SPG are disposed in a horizontal direction as an example. However, the present disclosure is not limited thereto. For example, the red subpixel SPR, the white subpixel SPW, the blue subpixel SPB, and the green subpixel SPG may be disposed in a vertical direction.

The plurality of low-potential voltage lines EVSS1 to EVSSn may be disposed in and outside the active area AA. The plurality of low-potential voltage lines EVSS1 to EVSSn may be disposed in the vertical direction and spaced apart from each other at a certain interval. Two of the plurality of low-potential voltage lines EVSS1 to EVSSn are disposed spaced apart for each data driver as an example. However, the present disclosure is not limited thereto. For example, low-potential voltage lines may be further disposed in response to the number of pixels PIX between the first low-potential voltage line EVSS1 and the second low-potential voltage line EVSS2 connected to the first data driver 140*a*.

The plurality of low-potential voltage lines EVSS1 to EVSSn are voltage lines transmitting low-potential voltages to the plurality of pixels PIX. However, the plurality of low-potential voltage lines EVSS1 to EVSSn may be used as sensing lines. The plurality of low-potential voltage lines EVSS1 to EVSSn may transmit low-potential voltages during an image display period of the display panel 150, and may not transmit low-potential voltages during an element sensing period of the display panel 150.

The power supply may not output low-potential voltages through the plurality of low-potential voltage lines EVSS1 to EVSSn during the sensing period. In this case, the plurality of low-potential voltage lines EVSS1 to EVSSn may be temporarily in a floating state or a specific voltage may be formed by a voltage source (VREF of FIG. 7), etc. included in each of the first to fourth data drivers 140*a* to 140*d*.

The display module 100 according to the experimental example may sense element(s) included in a subpixel of a pixel PIX based on the first to fourth data drivers 140*a* to 140*d* connected to the plurality of low-potential voltage lines EVSS1 to EVSSn. To this end, in the display module

100 according to the experimental example, the first to fourth data drivers 140*a* to 140*d* may be implemented in the form described in FIGS. 6 and 7. Further, to operate the display module 100 according to the experimental example as in FIGS. 8 and 9, the first to fourth data drivers 140*a* to 140*d* and the scan driver may be linked under the control of the timing controller. Further, the display module 100 according to the experimental example may sense element (s) included in subpixels of all pixels PIX or some pixels PIX of the display panel 150 and provide a compensation value according to a degree of characteristic change.

Figure 11:
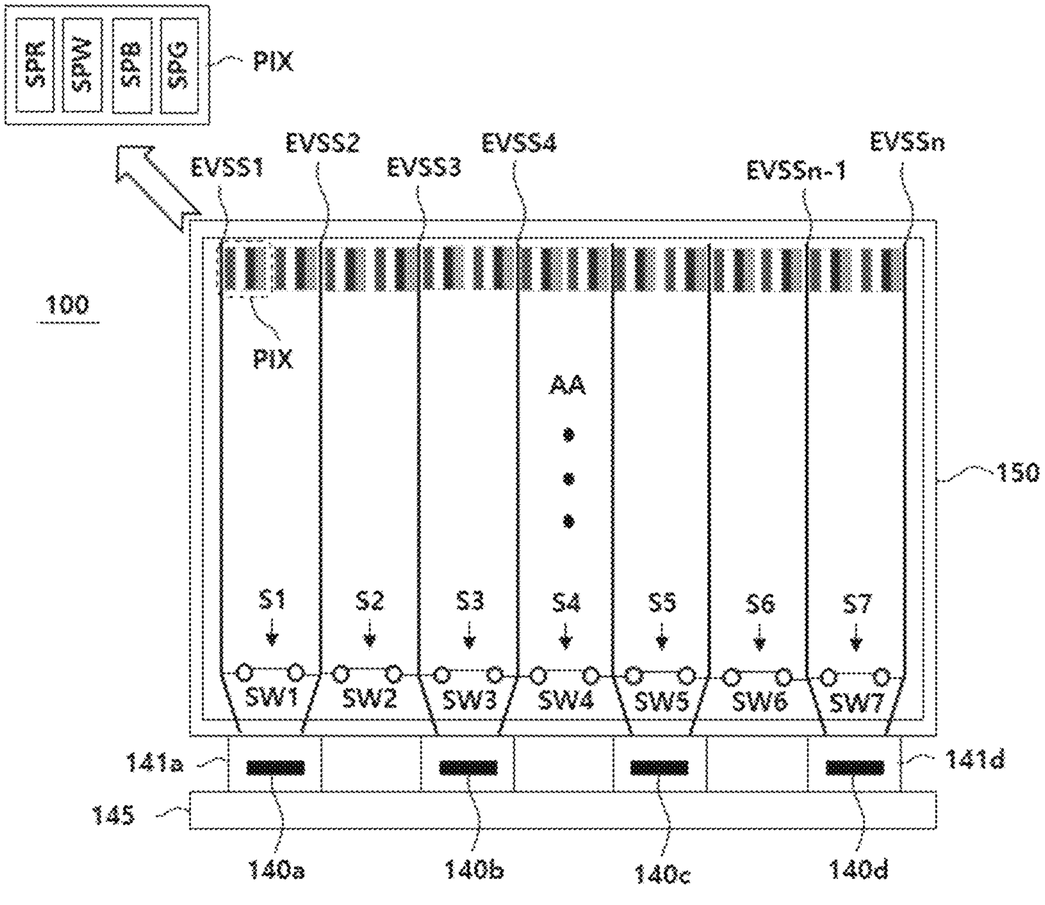
FIG. 11 is a diagram illustrating a display module according to a first example embodiment.
Figure 14:
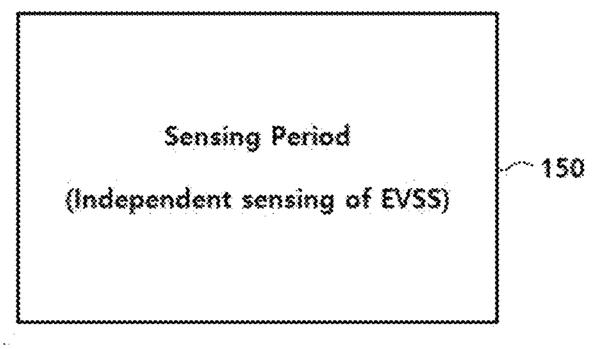
Figure 15:
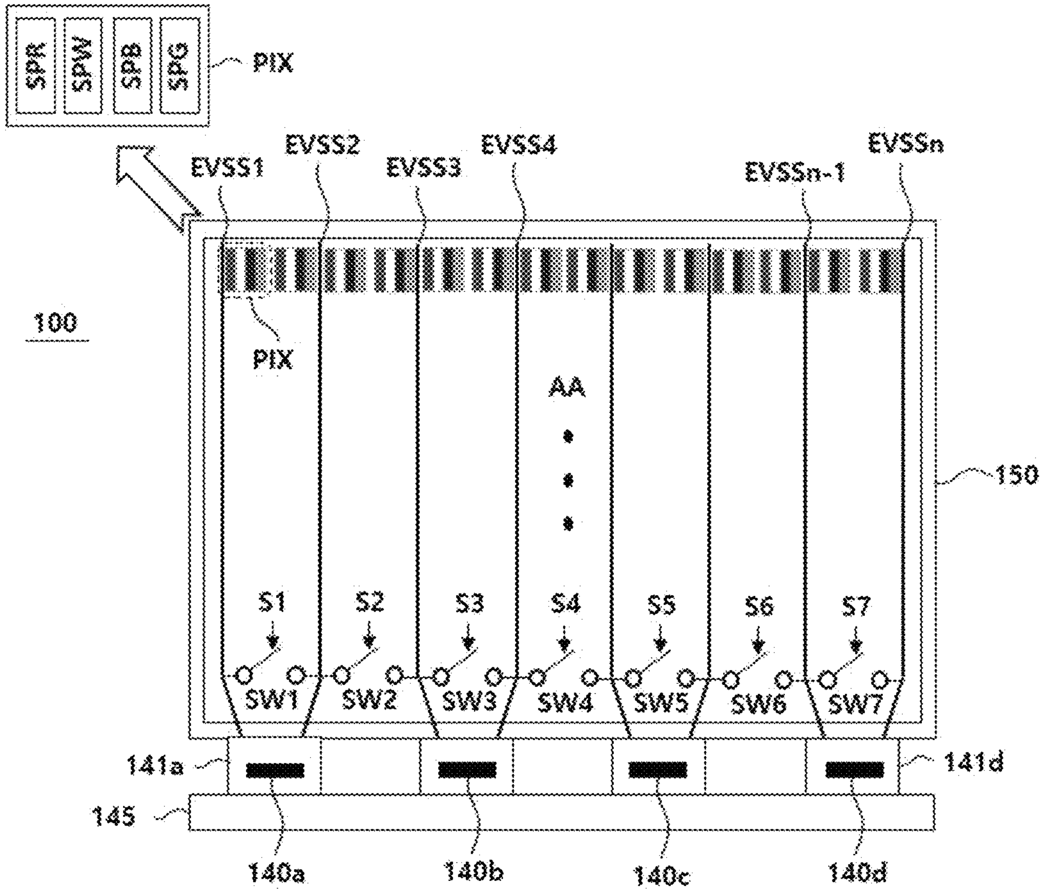
Figure 16:
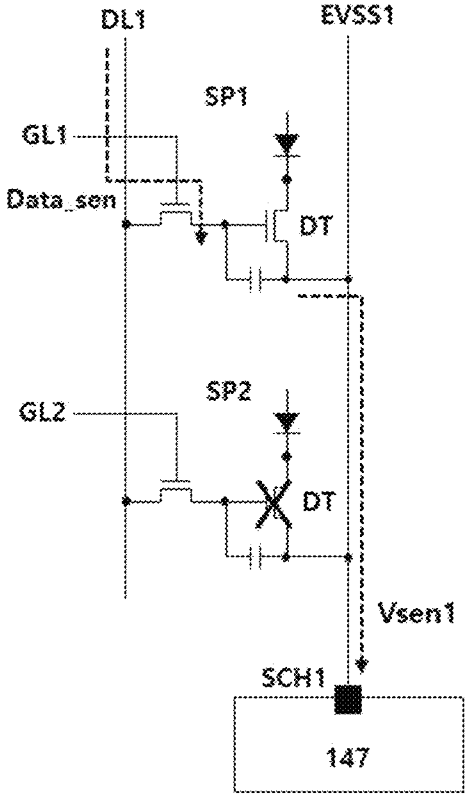
FIGS. 16 and 17 are example diagrams for describing a sensing process of subpixels connected to one low-potential voltage line according to the first embodiment.
Figure 17:
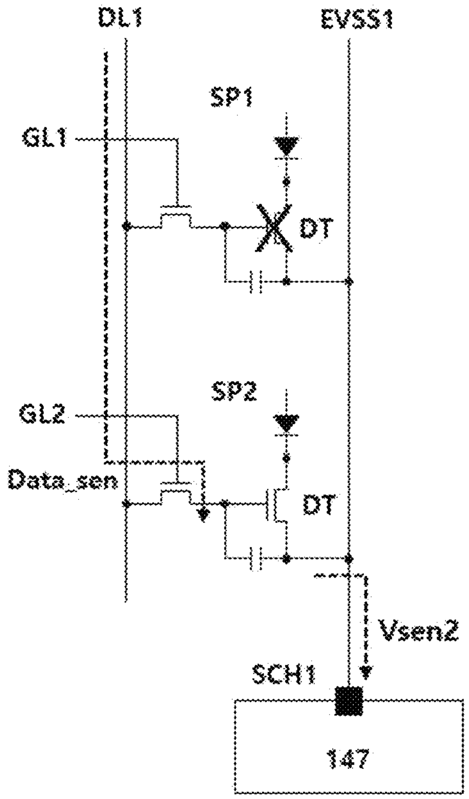

FIG. 11 is a diagram illustrating a display module according to a first example embodiment, FIGS. 12 to 15 are example diagrams for describing the display module according to the first embodiment separately for each driving period, and FIGS. 16 and 17 are example diagrams for describing a sensing process of subpixels connected to one low-potential voltage line according to the first embodiment.

As illustrated in FIG. 11, the display module 100 according to the first example embodiment may include a display panel 150, first to fourth flexible circuit boards 141*a* to 140*d* on which first to fourth data drivers 140*a* to 140*d* are mounted, respectively, and a printed circuit board 145.

The display panel 150 may include a plurality of pixels PIX and a plurality of low-potential voltage lines EVSS1 to EVSSn. The plurality of pixels PIX may be disposed in an active area AA. Each of the plurality of pixels PIX may include a red subpixel SPR, a white subpixel SPW, a blue subpixel SPB, and a green subpixel SPG.

The plurality of low-potential voltage lines EVSS1 to EVSSn may be disposed inside and outside the active area AA. The plurality of low-potential voltage lines EVSS1 to EVSSn may be disposed in the vertical direction and may be spaced apart from each other by a certain distance.

The display module 100 according to the first embodiment is similar to that of the experimental example. However, there is a difference in that a plurality of switches SW1 to SW7 are disposed between the plurality of low-potential voltage lines EVSS1 to EVSSn and a difference in operation thereof. A description thereof is as follows.

The plurality of switches SW1 to SW7 may each be disposed between the plurality of low-potential voltage lines EVSS1 to EVSSn disposed spaced apart from each other on the display panel 150. The plurality of switches SW1 to SW7 may be controlled so that the plurality of low-potential voltage lines EVSS1 to EVSSn disposed spaced apart from each other on the display panel 150 are or are not electrically (physically) connected to each other. For example, the first switch SW1 may have a first electrode connected to the first low-potential voltage line EVSS1, a second electrode connected to the second low-potential voltage line EVSS2, and a control electrode connected to a first switch control line S1. The second switch SW2 may have a first electrode connected to the second low-potential voltage line EVSS2, a second electrode connected to the third low-potential voltage line EVSS3, and a control electrode connected to a second switch control line S2. The remaining third switch SW3 to seventh switch SW7 may be connected in the same manner as above.

The plurality of switches SW1 to SW7 may be turned on during the image display period of the display panel 150 and may be turned off during the element sensing period of the display panel 150. A driving period operation of the display module 100 according to the first embodiment will be described as follows.

Figure 12:
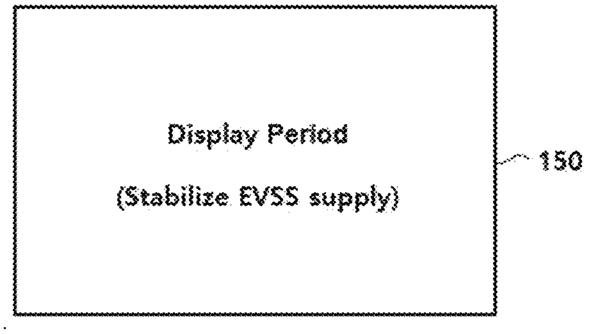
FIGS. 12 to 15 are example diagrams for describing the display module according to the first embodiment separately for each driving period.
Figure 13:
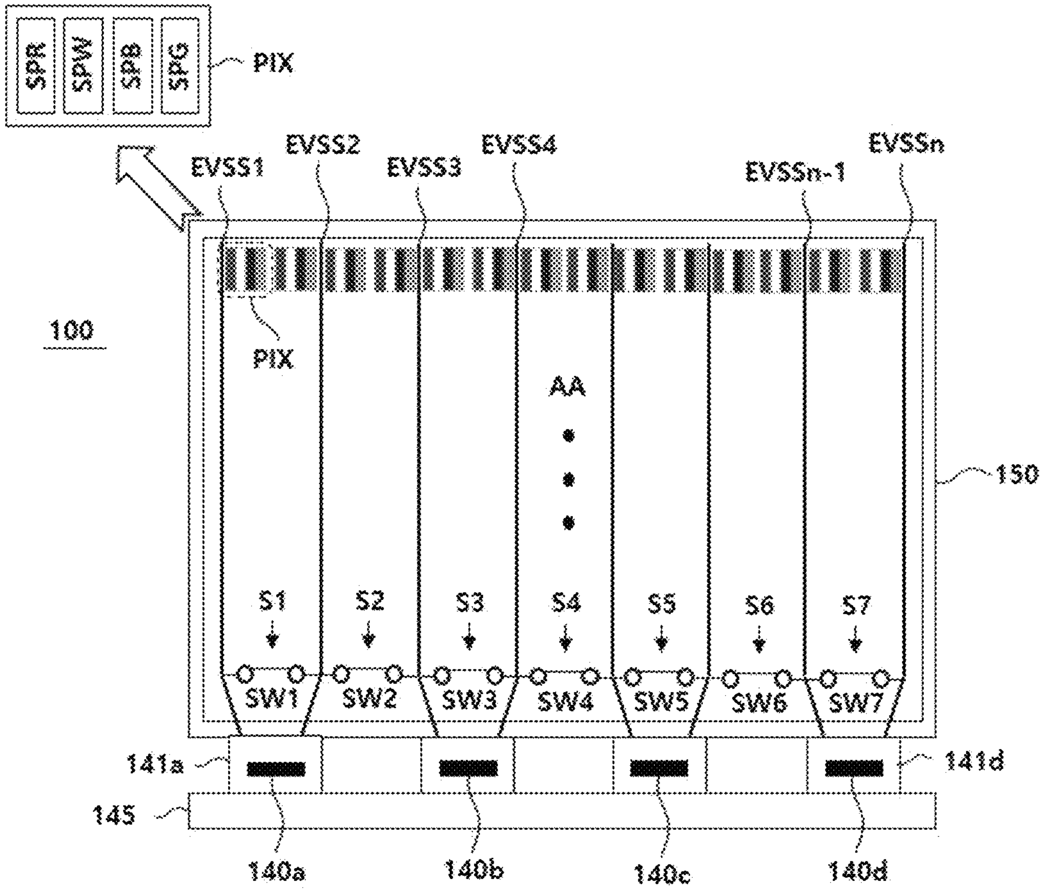

As illustrated in FIGS. 12 and 13, the display module 100 according to the first embodiment may have a display period in which an image is displayed on the display panel 150. During the display period, the plurality of switches SW1 to SW7 may all be in a turn-on state. To this end, a turn-on voltage (for example, high voltage) may be applied to each of a plurality of switch control lines S1 to S7.

When all of the plurality of switches SW1 to SW7 are turned on, the plurality of low-potential voltage lines EVSS1 to EVSSn may be electrically (physically) connected to each other. In this case, the plurality of low-potential voltage lines EVSS1 to EVSSn may uniformly and stably transmit low-potential voltages or corresponding currents. As a result, it is possible to increase stability and uniformity of low-potential voltages or corresponding currents applied to the entire area of the display panel 150. In addition, it is possible to increase sensing accuracy and sensing reliability of the element(s) included in the subpixel.

As illustrated in FIGS. 14 and 15, the display module 100 according to the first embodiment may include a sensing period in which element(s) included in subpixels of all pixels PIX or some pixels PIX are sensed. During the sensing period, all of the plurality of switches SW1 to SW7 may be in a turn-off state. To this end, a turn-off voltage (for example, low voltage) may be applied to each of the plurality of switch control lines S1 to S7.

When all of the plurality of switches SW1 to SW7 are turned off, the plurality of low-potential voltage lines EVSS1 to EVSSn may be electrically (physically) disconnected from each other (separated state). In this case, the plurality of low-potential voltage lines EVSS1 to EVSSn may be separated (divided) by line (by location or area). As a result, sensing accuracy of the element(s) included in subpixels of all pixels PIX or some pixels PIX of the display panel 150 may be increased.

As illustrated in FIGS. 16 and 17, a plurality of subpixels may be connected to the first low-potential voltage line EVSS1 disposed in the vertical direction in response to the number of gate lines disposed in the horizontal direction. Hereinafter, an example in which two subpixels SP1 and SP2 are connected to the first low-potential voltage line EVSS1 will be described.

As illustrated in FIG. 16, to sense the first subpixel SP1 connected to the first gate line GL1, it is possible to set a condition that the second subpixel SP2 connected to the second gate line GL2 is not sensed (for example, DT of SP2 not driven). To this end, a sensing data voltage Data_sen for promoting element sensing may be applied to the first subpixel SP1. However, to set the condition that the second subpixel SP2 is not sensed, a black data voltage (voltage for forming a non-sensing condition) may be applied to the second subpixel SP2 instead of applying the sensing data voltage Data_sen. An example thereof is the case in which on-voltage scan signals (a scan signal capable of turning on a switching transistor) are sequentially applied through the first gate line GL1 and the second gate line GL2. However, when scan signals are simultaneously applied through the first gate line GL1 and the second gate line GL2, an on-voltage scan signal may be applied to the first gate line GL1 and an off-voltage scan signal may be applied to the second gate line GL2 (a scan signal capable of turning off the switching transistor), or a method of omitting (not applying) output of the scan signal may be used.

As illustrated in FIG. 17, to sense the second subpixel SP2 connected to the second gate line GL2, it is possible to set a condition that the first subpixel SP1 connected to the first gate line GL1 is not sensed (for example, DT of SP1 is not driven). To this end, a sensing data voltage Data_sen for promoting element sensing may be applied to the second gate line GL2. A condition that the first gate line GL1 is not sensed may be obtained with reference to the above-described method. However, the present disclosure is not limited thereto.

Figure 18:
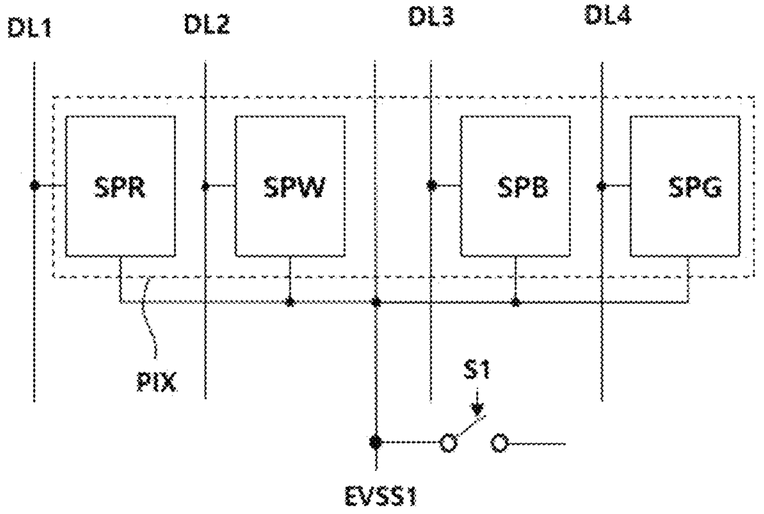
FIGS. 18 and 19 are example diagrams illustrating a connection relationship between subpixels included in a display module and a low-potential voltage line.
Figure 19:
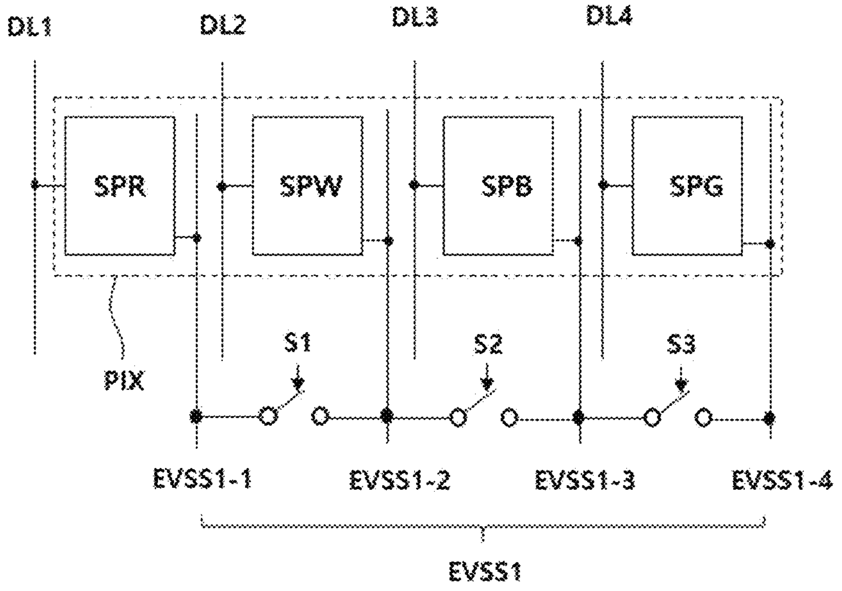

FIGS. 18 and 19 are diagrams illustrating a connection relationship between subpixels included in a display module and a low-potential voltage line.

As illustrated in FIG. 18, the red subpixel SPR, the white subpixel SPW, the blue subpixel SPB, and the green subpixel SPG included in one pixel PIX may have a connection relationship of sharing the first low-potential voltage line EVSS1. In this case, the first switch SW1 may be connected between the first low-potential voltage line EVSS1 and the second low-potential voltage line.

As illustrated in FIG. 19, the red subpixel SPR, the white subpixel SPW, the blue subpixel SPB, and the green subpixel SPG included in one pixel PIX may include (1-1)th to (1-4)th low-potential voltage lines EVSS1-1 to EVSS1-4 each having a separated connection relationship. In this case, the first to third switches SW1 to SW3 may be connected between the (1-1)th to (1-4)th low-potential voltage lines EVSS1-1 to EVSS1-4, respectively.

In the structure described with reference to FIG. 18, four subpixels (or three subpixels) share one low-potential voltage line, and thus one of the four subpixels may be independently sensed during a sensing period.

In contrast, in the structure described with reference to FIG. 19, four subpixels (or three subpixels) are connected to four separate low-potential voltage lines, respectively, and thus the four subpixels may be simultaneously sensed during the sensing period. In addition, in the structure described with reference to FIG. 19, low-potential voltage lines are allocated to every four subpixels (or three subpixels), and thus it is possible to increase stability and uniformity of the low-potential voltage or the corresponding current.

Meanwhile, in the first embodiment, the plurality of switches has been illustrated and described as being disposed in the active area of the display panel as an example. However, the plurality of switches may be disposed in the non-active area of the display panel or on the flexible circuit board on which the data driver is mounted. In addition, in the first embodiment, the plurality of switches has been illustrated and described as being all turned off during the sensing period as an example. However, the plurality of switches may be separately turned off sequentially (reverse sequentially) or selectively (randomly) depending on the sensing area, sensing method, etc.

Figure 20:
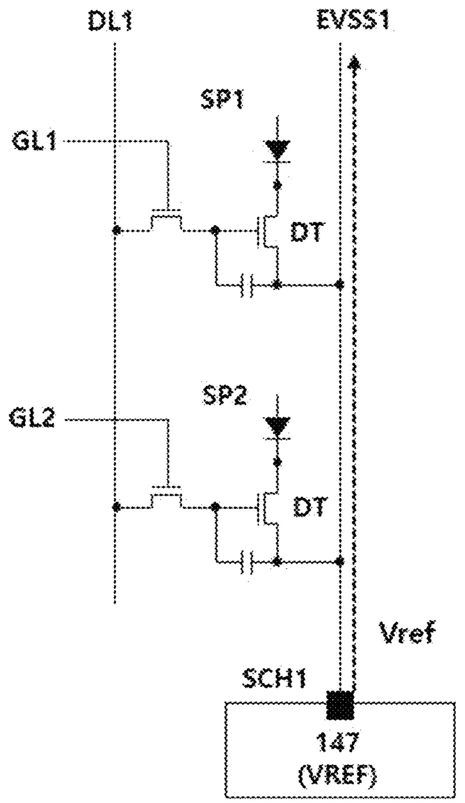
FIGS. 20 and 21 are diagrams for describing a reference voltage variable operation of a pixel sensing circuit according to a second example embodiment.
Figure 21:
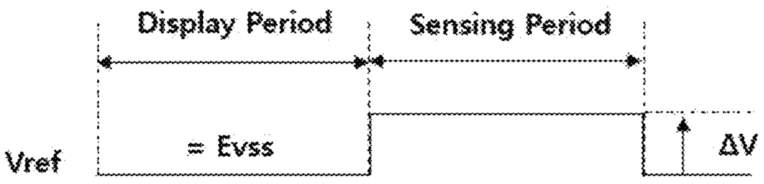
Figure 22:
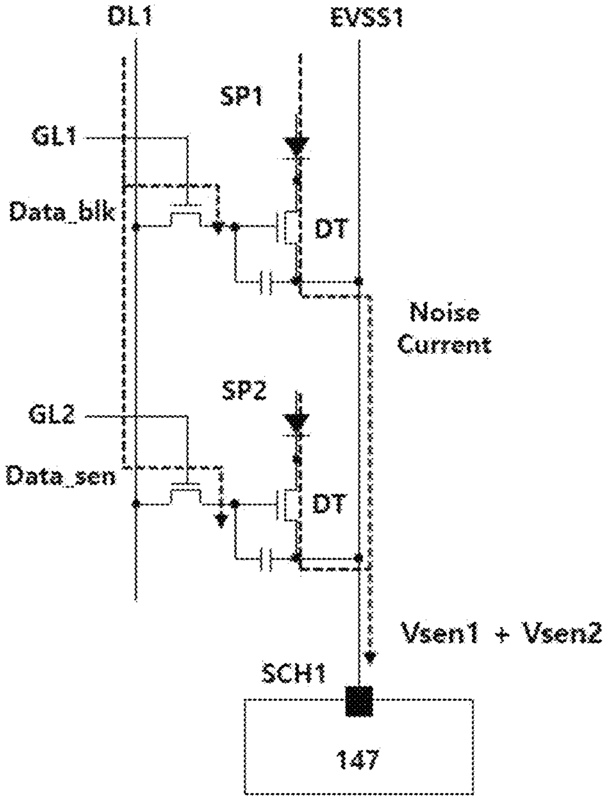
FIGS. 22 and 23 are example diagrams for describing advantages of the second embodiment.
Figure 23:
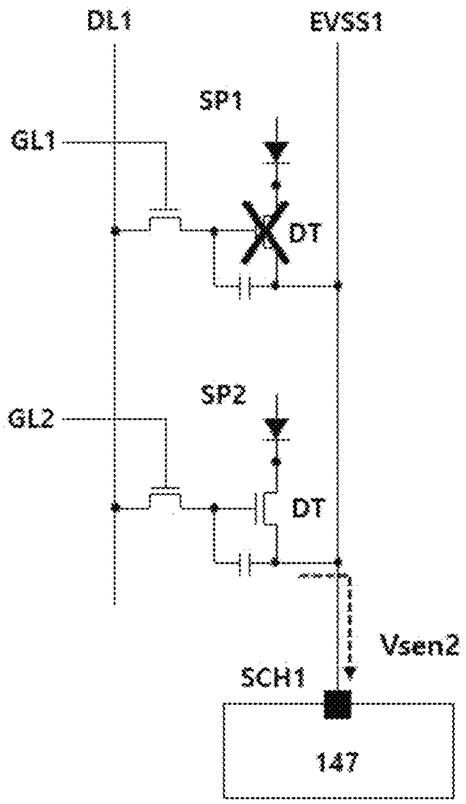

FIGS. 20 and 21 are diagrams for describing a reference voltage variable operation of a pixel sensing circuit according to a second example embodiment, and FIGS. 22 and 23 are example diagrams for describing advantages of the second embodiment.

As illustrated in FIGS. 20 and 21, the pixel sensing circuit 147 according to the second embodiment may output a voltage equal to a low-potential voltage Evss or may float without being electrically connected to the first low-potential voltage line EVSS1 during the display period. Further, during the sensing period, it is possible to output a reference voltage Vref at a higher voltage level than that of the low-potential voltage Evss (for example, Vref is a voltage higher than Evss and may have ΔV exceeding 0 V and less than or equal to 3.0 V) to the first low-potential voltage line EVSS1.

As illustrated in FIGS. 22 and 23, even when a black data voltage Data_blk (for example, 0.5 V) is applied to the first subpixel SP1 and the sensing data voltage Data_sen (for example, 4.5V) is applied to the second subpixel SP2 to sense the second subpixel SP2, there may be minute leakage through the driving transistor DT included in the first subpixel SP1.

When there is minute leakage, the pixel sensing circuit 147 may acquire Vsen1+Vsen2 including a sensing value Vsen1 of the first subpixel SP1 as well as a sensing value Vsen2 of the second subpixel SP2. In other words, the minute leakage acts as noise current during sensing.

In this way, when the sensing operation for sensing the second subpixel SP2 includes noise current due to the first subpixel SP1, the pixel sensing circuit 147 may have difficulty accurately sensing element(s) included in the second subpixel SP2.

However, when outputting a reference voltage Vref higher than the low-potential voltage Evss during the sensing period, off characteristics of the driving transistor DT included in the first subpixel SP1 may be improved. For example, the reference voltage Vref may be set to have a higher voltage level (for example, ~3.0 V) than that of a gate-source voltage (for example, −2.5 V) of a driving transistor included in a subpixel that is not sensed.

Therefore, the second embodiment has the same configuration and operation as those of the first embodiment. However, the reference voltage Vref may be configured under the condition that minute leakage is prevented from occurring from the subpixel that is not sensed or generation of noise current may be minimized. That is, the second embodiment may increase sensing accuracy and sensing reliability of the element(s) included in the subpixel.

Meanwhile, according to the second embodiment, a level of the sensing data voltage Data_sen may need to increase in response to a level increase in the reference voltage Vref. For example, when the reference voltage Vref is increased to 3.0 V to solve occurrence of minute leakage at the time of applying the sensing data voltage Data_sen at 4.5 V, the sensing data voltage Data_sen may be increased to 7 V in response to an increase in the reference voltage Vref.

Figure 24:
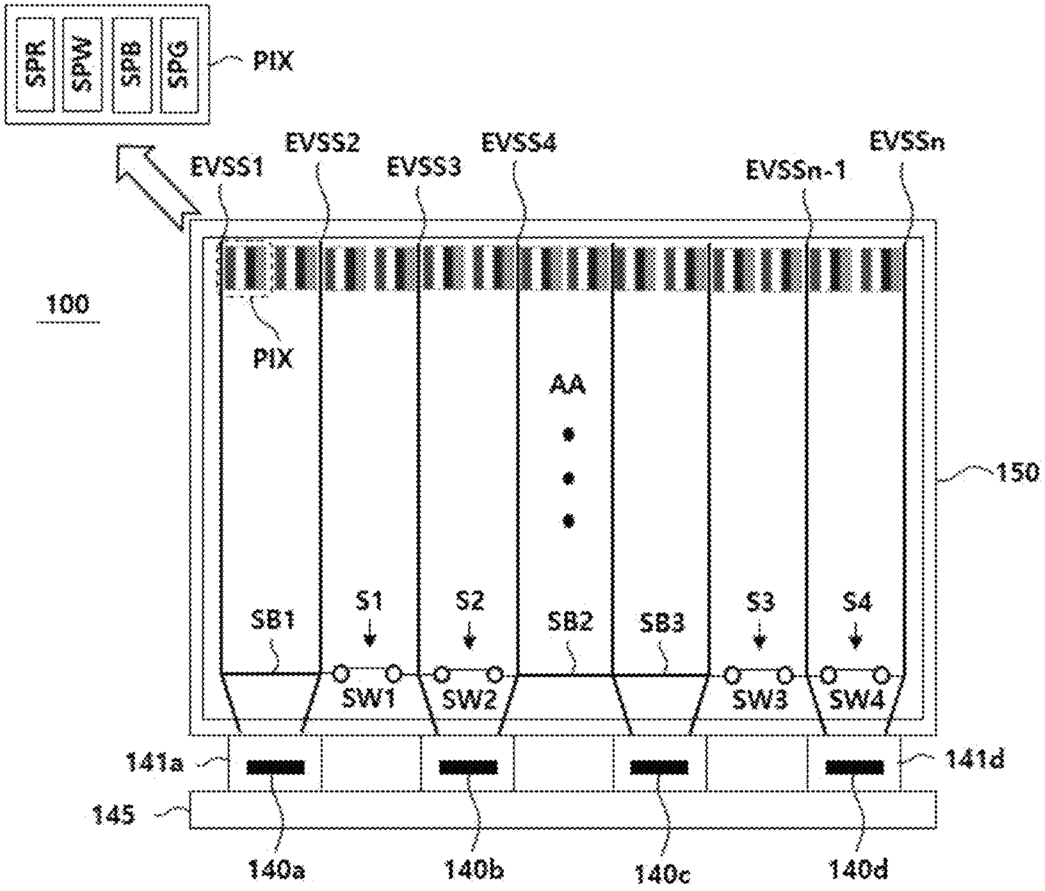
FIG. 24 is a diagram illustrating a display module according to a third example embodiment.

FIG. 24 is a diagram illustrating a display module according to a third example embodiment, and FIGS. 25 to 28 are example diagrams for describing the display module according to the third embodiment separately for each driving period.

As illustrated in FIG. 24, the display module 100 according to the third embodiment may include a display panel 150, first to fourth flexible circuit boards **141*a* to 141*d* on which first to fourth data drivers 140*a* to 140*d* are mounted, respectively, and a printed circuit board 145**.

The display panel 150 may include a plurality of pixels PIX, a plurality of low-potential voltage lines EVSS1 to EVSSn, a plurality of switches SW1 to SW4, and a plurality of shorting bars SB1 to SB3. The plurality of pixels PIX may be disposed in the active area AA. Each of the plurality of pixels PIX may include a red subpixel SPR, a white subpixel SPW, a blue subpixel SPB, and a green subpixel SPG.

The plurality of low-potential voltage lines EVSS1 to EVSSn may be disposed in and outside the active area AA. The plurality of low-potential voltage lines EVSS1 to EVSSn may be disposed in the vertical direction and may be spaced apart from each other by a certain distance.

The display module 100 according to the third embodiment is similar to the first or second embodiment. However, there is a difference in that the plurality of shorting bars SB1 to SB3 are disposed between the plurality of switches SW1 to SW4, and thus a switch arrangement area and a shorting bar arrangement area are provided, which is described as follows.

The plurality of switches SW1 to SW4 may be selectively disposed between the plurality of low-potential voltage lines EVSS1 to EVSSn disposed spaced apart from each other on the display panel 150. The plurality of switches SW1 to SW4 may be controlled so that a low-potential voltage line selected from the plurality of low-potential voltage lines EVSS1 to EVSSn disposed spaced apart from each other on the display panel 150 is or is not electrically (physically) connected. For example, the first switch SW1 may have a first electrode connected to the second low-potential voltage line EVSS2, a second electrode connected to the third low-potential voltage line EVSS3, and a control electrode connected to the first switch control line S1. The second switch SW2 may have a first electrode connected to the third low-potential voltage line EVSS3, a second electrode connected to the fourth low-potential voltage line EVSS4, and a control electrode connected to the second switch control line S2. The remaining third switch SW3 and fourth switch SW4 may be connected adjacently in the same manner as above.

The plurality of shorting bars SB1 to SB3 may be selectively disposed between the plurality of low-potential voltage lines EVSS1 to EVSSn spaced apart from each other on the display panel 150. The plurality of shorting bars SB1 to SB3 may be disposed so that a low-potential voltage line selected from the plurality of low-potential voltage lines EVSS1 to EVSSn disposed spaced apart from each other on the display panel 150 is kept in an electrically (physically) connected state. For example, the first shorting bar SB1 may have one end connected to the first low-potential voltage line EVSS1 and the other end connected to the second low-potential voltage line EVSS2. The second shorting bar SB2 may have one end connected to the fourth low-potential voltage line EVSS4 and the other end connected to the fifth low-potential voltage line EVSS5.

The plurality of switches SW1 to SW4 may be turned on during the image display period of the display panel 150 and may be turned off during the element sensing period of the display panel 150. A driving period operation of the display module 100 according to the third embodiment will be described as follows.

Figure 25:
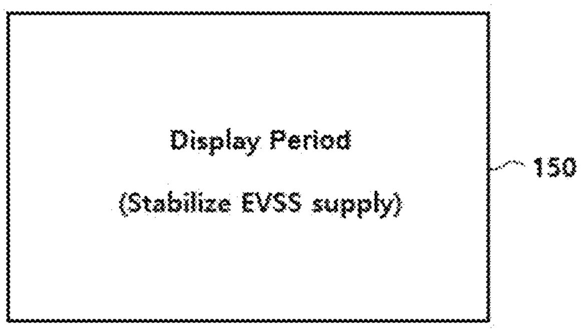
FIGS. 25 to 28 are example diagrams for describing the display module according to the third embodiment separately for each driving period.
Figure 26:
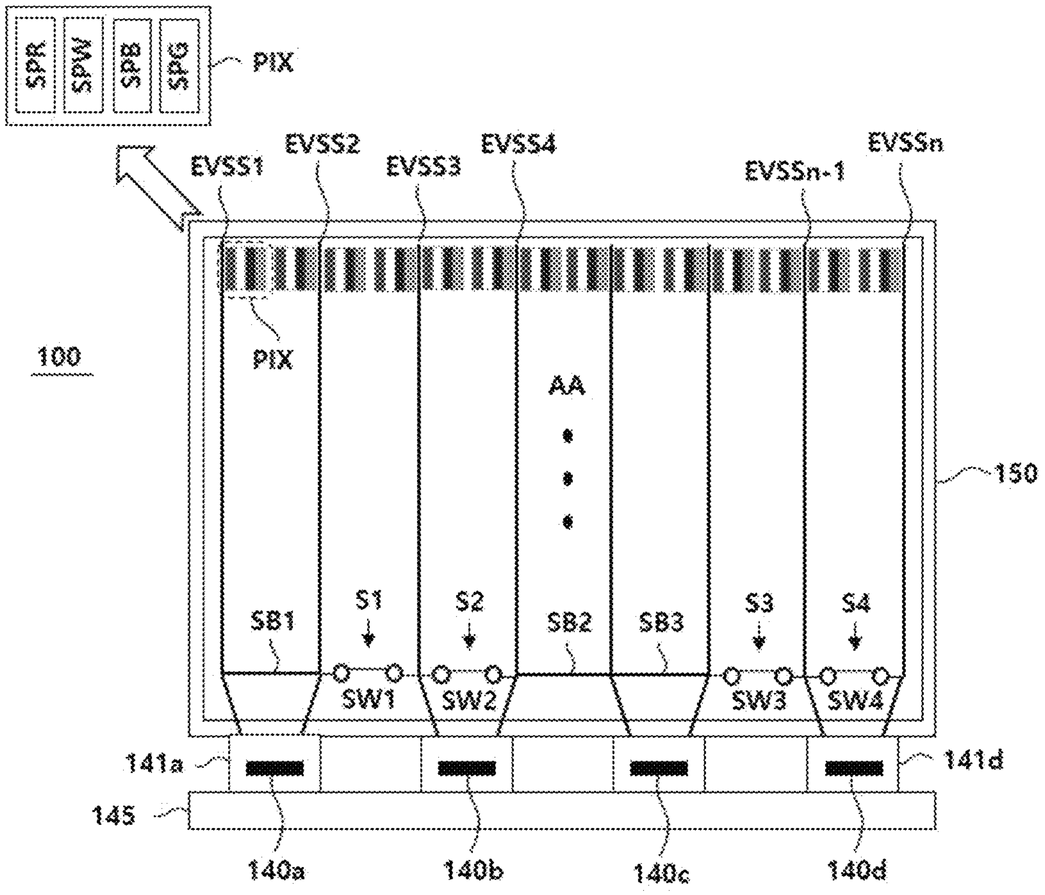

As illustrated in FIGS. 25 and 26, the display module 100 according to the third embodiment may include a display period in which an image is displayed on the display panel 150. During the display period, the plurality of switches SW1 to SW4 may all be in a turn-on state. To this end, a turn-on voltage (for example, high voltage) may be applied to each of the plurality of switch control lines S1 to S4.

When all of the plurality of switches SW1 to SW4 are turned on, the plurality of low-potential voltage lines EVSS1 to EVSSn may be electrically (physically) connected. In this case, the plurality of low-potential voltage lines EVSS1 to EVSSn may uniformly and stably transmit low-potential voltages or corresponding currents. As a result, stability and uniformity of the low-potential voltages or corresponding currents applied to the entire area of the display panel 150 may be increased.

Figure 27:
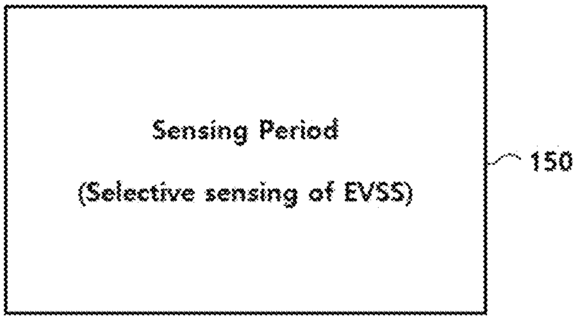
Figure 28:
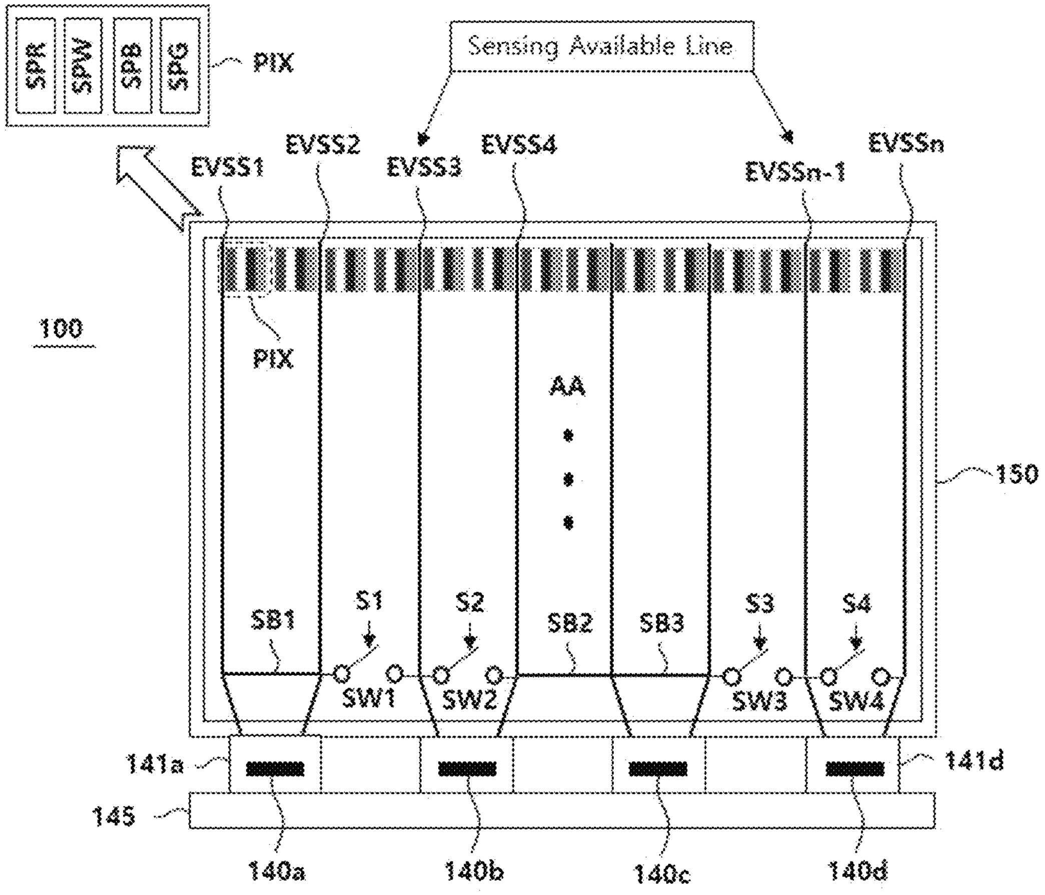

As illustrated in FIGS. 27 and 28, the display module 100 according to the third embodiment may include a sensing period in which element(s) included in subpixels of some pixels PIX in the display panel 150 are sensed. During the sensing period, the plurality of switches SW1 to SW4 may all be in a turn-off state. To this end, a turn-off voltage (for example, low voltage) may be applied to each of the plurality of switch control lines S1 to S4.

When all of the plurality of switches SW1 to SW4 are turned off, the plurality of low-potential voltage lines EVSS1 to EVSSn may be electrically (physically) disconnected (separated state). In this case, the plurality of low-potential voltage lines EVSS1 to EVSSn may be separated (divided) by line (by location or area). As a result, sensing precision of the element(s) included in the subpixels of some pixels PIX in the display panel 150 may be increased.

Meanwhile, in the third embodiment, as illustrated in FIG. 28, an example in which there are two sensing available lines, the third low-potential voltage line EVSS3 and the (N−1)th low-potential voltage line EVSSn−1, has been illustrated. A reason therefor is described as follows.

The first switch SW1 is disposed on the left side of the third low-potential voltage line EVSS3, and the second switch SW2 is disposed on the right side thereof. Further, the third switch SW3 is disposed on the left side of the (N−1)th low-potential voltage line EVSSn−1, and the fourth switch SW4 is disposed on the right side thereof. When the first to fourth switches SW1 to SW4 are turned on, the third low-potential voltage line EVSS3 and the (N−1)th low-potential voltage line EVSSn−1 may be in an independent state, unlike other low-potential voltage lines.

In this case, the second data driver 140*b* may sense element(s) included in a subpixel of a pixel PIX connected to the third low-potential voltage line EVSS3, and the fourth data driver 140*d* may sense element(s) included in a subpixel of a pixel PIX connected to the (N−1)th low-potential voltage line EVSSn−1. Therefore, a switch may be disposed adjacent to a low-potential voltage line connected to a pixel PIX to be sensed, and a shorting bar may be disposed adjacent to a low-potential voltage line connected to a pixel PIX not to be sensed.

Meanwhile, in the third embodiment, an example in which the plurality of switches SW1 to SW4 are disposed in the active area AA of the display panel 150 has been illustrated and described. However, the plurality of switches SW1 to SW4 may be disposed in the non-active area or on the flexible circuit boards 141*a* to 141*d* on which the data drivers 140*a* to 140*d* are disposed. In addition, in the third embodiment, an example in which the plurality of switches SW1 to SW4 are all turned off during the sensing period has been illustrated and described. However, the plurality of switches SW1 to SW4 may be separately turned off sequentially (reverse sequentially) or selectively (randomly) depending on the sensing area, sensing method, etc.

As described above, the present disclosure has an effect of being able to improve display quality and lifespan by sensing element(s) included in a subpixel through a low-potential voltage line, determining the presence or absence of a change in characteristics (threshold voltage, current mobility, etc.) of an element, and compensating for a subpixel depending on the degree of change in characteristics. In addition, the present disclosure has an effect of being able to improve sensing accuracy and sensing reliability of element(s) included in a subpixel. In addition, the present disclosure has an effect of being able to selectively sense element(s) included in a subpixel located in the entire or partial area of a display panel based on a switch connected between low-potential voltage lines or an arrangement structure of a switch and a shorting bar, and compensate for a non-sensed subpixel based thereon.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device, comprising:

a display panel comprising a plurality of subpixels connected to at least one first voltage line and a plurality of second voltage lines, respectively, the at least one first voltage line being configured to transmit a first supply voltage, and the plurality of second voltage lines being configured to transmit a second supply voltage lower than the first supply voltage;

a driver configured to drive the display panel;

at least one switch connected between two second voltage lines next to each other among the plurality of second voltage lines, the two second voltage lines extending in a first direction in parallel to each other and being spaced apart from and next to each other in a second direction different from the first direction; and a circuit configured to sense and compensate for a characteristic of a subpixel, among the plurality of subpixels, through a second voltage line, among the two second voltage lines, connected to the subpixel.

2. The display device according to claim 1, wherein the plurality of second voltage lines are parallel to a data line extending in the first direction on the display panel.

3. The display device according to claim 1, wherein:

the at least one switch is configured to be turned on during a display period in which an image is displayed based on the plurality of subpixels; and the at least one switch is configured to be turned off during a sensing period in which the characteristic of the subpixel is sensed.

4. The display device according to claim 3, wherein the circuit is further configured to sense the characteristic of the subpixel by using the second voltage line as a sensing line during the sensing period.

5. The display device according to claim 1, wherein the at least one switch is selectively disposed in one of an active area and a non-active area of the display panel.

6. The display device according to claim 4, wherein a reference voltage higher than the second supply voltage applied during the display period is applied to the second voltage line used as the sensing line during the sensing period.

7. The display device according to claim 1, wherein the display panel further comprises:

at least one shorting bar electrically connecting two other second voltage lines next to each other in the plurality of second voltage lines;

a switch arrangement area in which the at least one switch is disposed; and a shorting bar arrangement area in which the at least one shorting bar is disposed.

8. The display device of claim 1, wherein:

the display panel has a display period during which an image is displayed based on the plurality of subpixels and a sensing period during which the characteristic of the subpixel is sensed; and the plurality of second voltage lines are configured to transmit the second supply voltage respectively to the plurality of subpixels during the display period and not to transmit the second supply voltage to the plurality of subpixels during the sensing period.

9. The display device of claim 8, wherein:

the at least one switch is configured to be turned on during the display period to electrically connect the two second voltage lines to each other; and the at least one switch is configured to be turned off during the sensing period to electrically disconnect the two second voltage lines from each other.

10. The display device of claim 8, further comprising:

at least one switch control line connected to the at least one switch and configured to transmit a turn-on voltage to the at least one switch during the display period and to transmit a turn-off voltage to the at least one switch during the sensing period.

11. The display device of claim 1, wherein:

the subpixel and at least two other subpixels, among the plurality of subpixels, configure one pixel; and the second voltage line is connected to each of the subpixel and the two other subpixels.

12. The display device of claim 1, further comprising:

a power supply configured to supply the first supply voltage to the at least one first voltage line and to supply the second supply voltage to the plurality of second voltage lines.

13. The display device of claim 1, wherein the at least one switch includes one electrode connected to one of the two second voltage lines and another electrode connected to the other of the two second voltage lines.

* * * * *